March 3, 1942.                    W. R. WILEY                    2,275,119
                                CLIP CONSTRUCTION
                              Filed Sept. 5, 1939
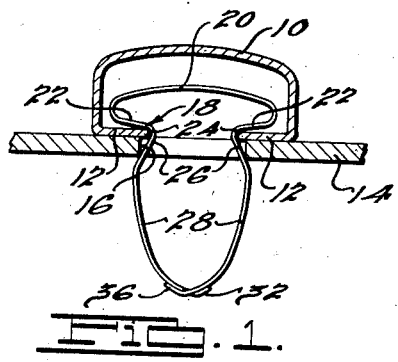
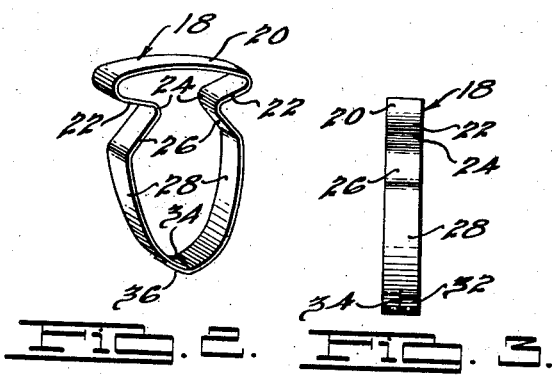
FIG. 1.   FIG. 2.   FIG. 3.
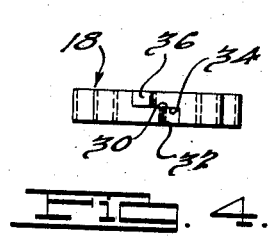
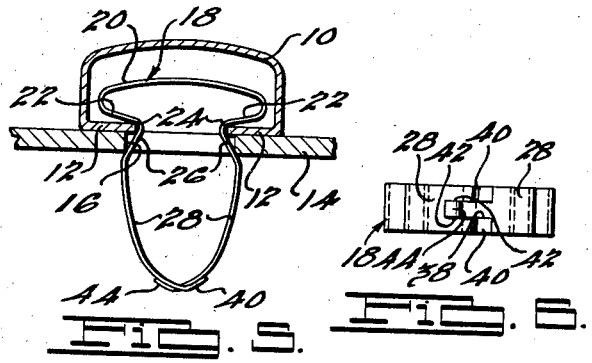
FIG. 4.   FIG. 5.   FIG. 6.
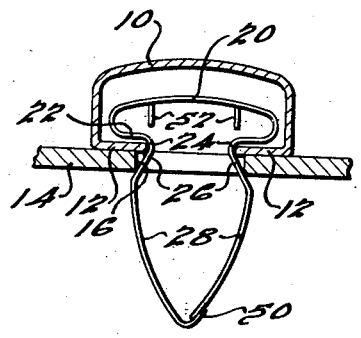
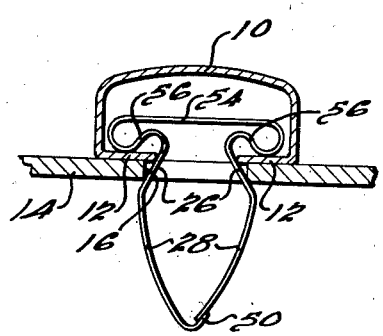
FIG. 7.   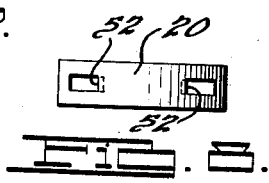   FIG. 9.
FIG. 8.
INVENTOR
William R. Wiley.
BY Harness, Dickey & Pierce.
ATTORNEYS.

Patented Mar. 3, 1942

2,275,119

UNITED STATES PATENT OFFICE 2,275,119

CLIP CONSTRUCTION

William R. Wiley, Birmingham, Mich.

Application September 5, 1939, Serial No. 293,336

2 Claims. (Cl. 24—73)

The present invention relates to resilient clip members for mounting sheet metal molding strips to sheet metal panels, and particularly relates to improved constructions over that disclosed and claimed in United States Letters Patent to William R. Wiley No. 2,084,717, patented June 22, 1937.

One of the primary objects of the present invention is to provide improved clip constructions which may be readily inserted through apertures in a panel so constructed that the legs of the clips which project through the aperture in the panel and engage the side wall thereof, do not collapse when the clips are inserted through the apertures.

Another object of the invention is to provide improved clip constructions of the type mentioned in which the legs of the clips which project through apertures in the supporting panel do not become displaced relative to each other when the clips are applied to the panel.

A further object of the invention is to provide improved clip constructions of the type mentioned in which both legs of the clips which project through the panel are locked with respect to each other so that said legs retain their normal position with respect to each other when applied to the supporting panel.

A further object of the present invention is to provide improved clip constructions which are constructed to provide stops or abutments which prevent the collapse of both of the legs of the clip when the clips are applied through apertures in a supporting panel.

Other objects of the invention will become apparent from the following specification, the drawing relating thereto and from the claims hereinafter set forth.

In the drawing, in which like numerals are used to designate like parts in the several views throughout:

Figure 1 is a fragmentary cross-sectional view, with the clip in elevation, of a sheet metal moulding strip attached to a panel by an improved clip construction according to the present invention;

Fig. 2 is a perspective view of the clip illustrated in Fig. 1;

Fig. 3 is a side elevational view of the clip illustrated in Fig. 2;

Fig. 4 is a bottom view of the clip illustrated in Fig. 3;

Fig. 5 is a view similar to Fig. 1, illustrating a modified form of clip construction according to the present invention;

Fig. 6 is a bottom plan view of the clip illustrated in Fig. 5;

Fig. 7 is a view similar to Fig. 1 illustrating a modified form of clip construction according to the present invention;

Fig. 8 is a top plan view of the clip illustrated in Fig. 7; and

Fig. 9 is a view similar to Fig. 1 illustrating another modified form of clip construction according to the present invention.

Referring to the drawing, and referring particularly to Figs. 1 through 4 thereof, a sheet metal channel-shaped molding strip 10 is illustrated having the usual inturned edges 12. It is, of course, to be understood that the strip 10 is elongated in shape and is adapted to be attached to a sheet metal panel 14, such as one of the body panels of an automobile, at spaced intervals along its length. The panel 14 is provided with a plurality of spaced openings or apertures 16 along the line which the molding strip is designed to occupy when in position.

The molding 10 is adapted to be secured to the panel 14 by means of clips, generally indicated at 18, which engage the molding strip 10 and engage the panel 14 through the apertures or openings 16. The clip 18 comprises a hardened and tempered sheet metal strip having the central portion thereof arched, as indicated at 20, to provide an arched head for reception within the molding 10. The next adjacent portions 22 are bent so that they converge inwardly to form a neck of less breadth than the head or arched portion 20. The base of this neck is indicated at 24, and those portions of the clip indicated at 26 adjacent the base 24, are then bent so that they diverge outwardly to provide shoulders which are adapted to bear against the under edge of openings 16 when the clips are in position. The converging portions 22, base 24, and diverging portions 26 form indentations in the clip in which the converging portions 22 bear against the facing edges of the flanges 12, and the outwardly diverging portions 26 bear against the under edges of the openings 16 to fix the molding 10 relative to the panel 14.

The clips may be applied to the molding 10 in the manner described in the Wiley patent referred to.

The ends or leg portions 28 of the clip, adjacent the outwardly diverging portions 26, converge toward each other to provide a resilient prong adapted for insertion into the aperture 16 in the panel 14. At the widest part of the leg or prong portion of the clip, such clip is wider than the width of the aperture through which the clip is applied, so that when the prong is forced through the apertures the legs are deformed inwardly, and due to their resiliency such legs resume their normal position when in the position shown in Fig. 1, so that the clips engage the apertures as described above. When being inserted through such apertures, there is a tendency for one of the legs 28 to move out of its position or become displaced with respect to the other leg, which, as is readily apparent, is disadvantageous in the application of the clip to the panel.

According to the present invention, the end portions 28 meet at the lowermost point of the clip and one of such leg portions is provided with a recess 30 in one side thereof, forming a tongue or projection 32 on the other side thereof. The other leg 28 is provided with a recess 34, complementary to the projection 32, which forms a tongue or projection 36, which is complementary to the recess 30. The projections 32 and 36 overlap their opposite legs so that the projection 36 seats within the recess 30 and projection 32 seats within recess 34. The projections or end portions 32 and 36 are then bent over their opposite respective legs so that the two legs 28 are positively locked and neither one can become displaced with respect to the other. When inserted within the apertures in the panel, the legs 28 retain their positions with respect to each other and do not become disengaged. The clip may thus be speedily applied through the apertures with the assurance that the legs thereof do not become disengaged during such application so that the molding 10 is firmly applied to its supporting panel 14.

Referring to Figs. 5 and 6, a modified form of clip construction is illustrated. The clip there illustrated is generally the same as the clip illustrated and described above in connection with Figs. 1 through 4, except that the locking means for the ends of legs 28 are modified. In Figs. 5 and 6, one of the legs 28 is provided with a central, longitudinal recess 38, thus forming side projections 40; and the other leg 28 is provided with side recesses 42, thus providing a central projection 44. The projection 44 is complementary to recess 38; and the projections 40 are complementary to recesses 42. The projection 44 and the projections 40 overlap their opposite legs 28 and are bent therearound so that a positive lock is provided between the two leg portions 28.

Referring to Figs. 7 and 8, another modified form of clip construction is illustrated in which instead of providing the positive lock between the lower ends of legs 28, as in the embodiment described above, one of legs 28 is longer than the other, as indicated at 50, so that such end portion 50 is bent over the plain end of the other, as in the structure described in the patent above referred to. In order to prevent the collapse of one of the legs 28, and particularly of that leg having the plain end, or to prevent displacement between the two legs when the clips are applied through the apertures, the head portion 20 is provided with instruck tabs 52. The tabs 52 are so constructed and arranged that they depend in a substantially vertical direction to a position immediately above the inner ends, respectively, of portions 22 of the clip. The tabs 52 extend downwardly toward such portions 22 to a position closely adjacent thereto, so that when the clips are applied through the molding, any movement of the legs 28 would cause movement of portion 22 toward the tabs 52. Such tabs 52 thus form stops or abutments against which the portions 22 would strike, so that the relative movement of legs 28 is prevented.

Referring to Fig. 9, a modified form of clip is illustrated which functions in a manner generally similar to that illustrated and described in connection with Figs. 7 and 8. The clip is generally of the form described above, except that the head portion 54, which corresponds to head portion 20, is generally flat. The adjacent portions, indicated at 56, which correspond to portions 22, are formed so that they are curved back toward the under surface of head portion 54 to a position closely adjacent thereto. These curved portions 56 thus form stops or abutments against which the head portion 54 would strike when the clips were forced through apertures 16. Relative movement between legs 28 would thus be prevented and such legs would merely resiliently come together in order to permit the passage through the apertures, in the same manner as the clips above described.

From the above description, it will be evident that the structures of the present invention provide simple clip constructions in which the legs of the clip, which extend through an aperture in the supporting panel, will not become displaced with respect to each other when such clips are applied to the panel.

Formal changes may be made in the specific embodiments of the invention described without departing from the spirit and substance of the invention, the scope of which is commensurate with the appended claims.

What is claimed is:

1. A clip for securing a channel-shaped molding strip having inturned flanges to a sheet metal panel having an aperture therein comprising a sheet metal strip formed into a closed loop, said strip being shaped to provide indentations in opposite sides thereof, the central portion of said strip forming a head adapted to be received within the channel of said molding, the end portions of said strip converging to form a resilient prong adapted to be forced through the aperture in said panel when said clip is mounted in position, and means on each end portion engaging and overlying the other end portion whereby to preclude displacement of each of said end portions with respect to the other.

2. A clip for securing a channel-shaped molding strip having inturned flanges to a sheet metal panel having an aperture therein comprising a sheet metal strip formed into a closed loop, said strip being shaped to provide indentations in opposite sides thereof, the central portion of said strip forming a head adapted to be received within the channel of said molding, the end portions of said strip converging to form a resilient prong adapted to be forced through the aperture in said panel when said clip is mounted in position, a tongue on the extreme end of each of said end portions, said tongue being of less width than said strip whereby to form a recess for receiving the tongue on the other end portion, each of said tongue portions seated in one of said recesses and reversely bent to overlie the opposite end portion whereby to preclude relative movement of each end portion with respect to the other.

WILLIAM R. WILEY.